United States Patent Office 3,028,090
Patented Apr. 3, 1962

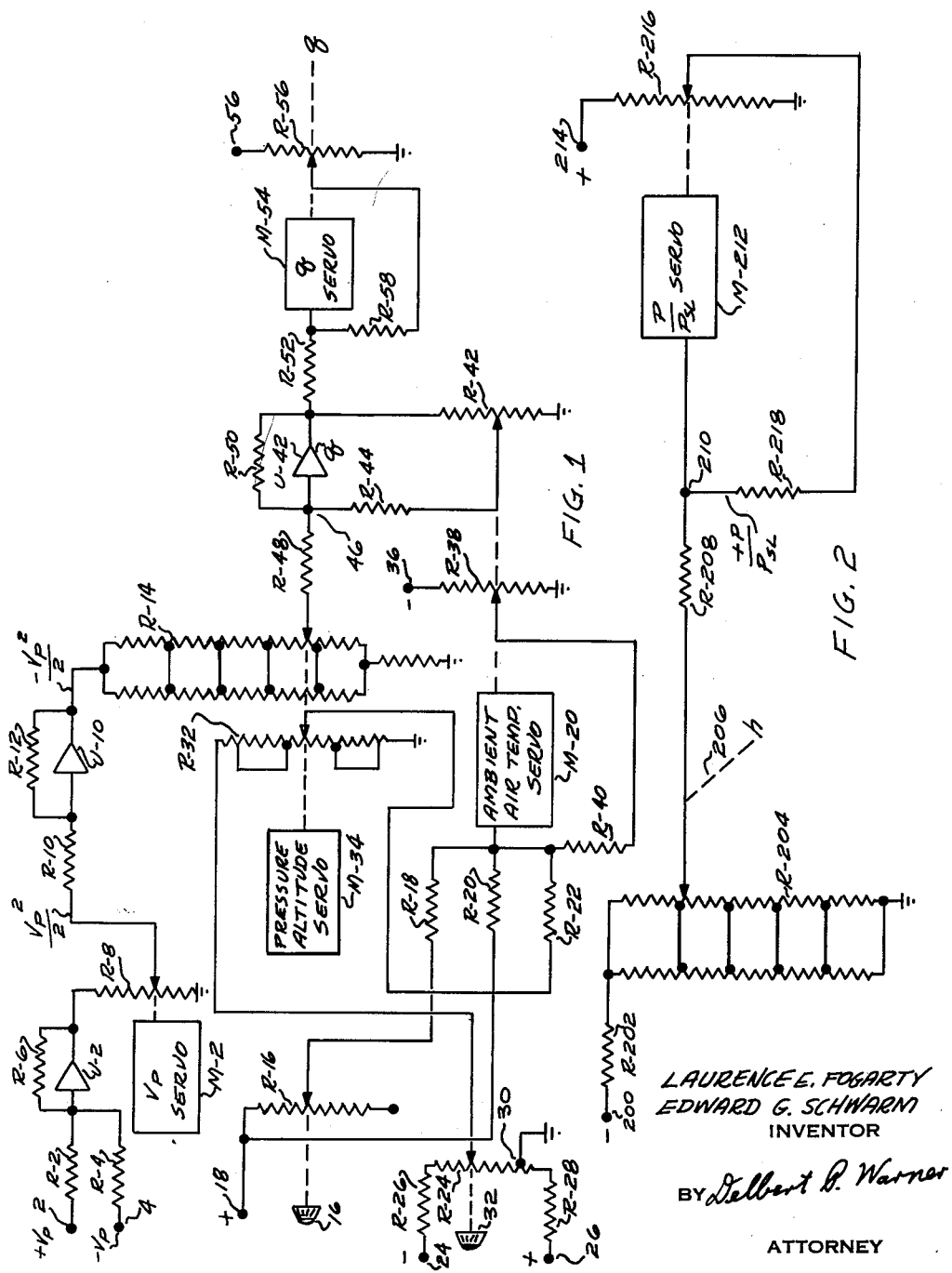

1

3,028,090
COMPUTATION OF DYNAMIC PRESSURE IN A FLIGHT SIMULATOR
Laurence E. Fogarty, Binghamton, and Edward G. Schwarm, Chenango Bridge, N.Y., assignors to General Precision, Inc., a corporation of Delaware
Filed June 19, 1958, Ser. No. 743,163
2 Claims. (Cl. 235—184)

The present invention refers to flight simulators and more particularly to means for computing dynamic pressure, and functions related thereto, for use in such simulators.

The prior art simulators have generally not taken into account all the factors necessary to accurately compute pressure. Most of them have provided some of the factors which must be used in computing dynamic pressure such as airspeed and altitude, but they have not provided voltages proportional to such factors as sea level temperature and temperature lapse rate in order to make it possible to accurately simulate temperature variations under different circumstances.

As indicated in the preceding paragraph, prior art simulators have not usually considered the factor of temperature and those which did usually had their computations based on the ICAO or the NACA standard day and failed to take into account changes in weather which occur from day to day, from one locality to the next and even from one layer of air to the next in a single locality.

Among those prior art simulators which purported to consider the effects of weather it was common practice to provide nonlinear potentiometers in connection with conventional altitude servos to give readings of outside temperature. No attempt was made, in most cases, to tie this reading into equipment capable of simulating the effects of the outside air temperature on the behaviour of the simulated aircraft.

Most simulators have been concerned with simulating the behaviour of propeller driven aircraft, capable only of speeds much below Mach 1. In aircraft which operate at relatively low speeds, the effect of ambient air temperature, or outside air temperature, on the aerodynamic behaviour is not too important and the prior art simulators were satisfactory. With the advent of high speed jet aircraft, the importance of this factor has increased to the point that simulators capable of use as jet aircraft simulators must be able to take this factor into account.

It is a primary object, therefore, of this invention to provide means for producing an accurate simulation of dynamic pressure in an aircraft trainer.

It is also an object of this invention to simulate the effects that weather conditions, as exemplified by air temperature and air pressure, produce in aircraft, It is a further object of this invention to provide realistic readings in a simulator of ambient air temperature, dynamic pressure and the like which accompany the changes which ensue in actual aircraft under varying weather conditions, It is yet a further object of this invention to provide means for computing the dynamic pressure on an actual aircraft when certain physical values are known.

The foregoing objects and others auxiliary thereto I prefer to accomplish as follows:

According to a preferred embodiment of my invention, I provide input voltages proportional to the airspeed of a simulated aircraft which are then operated upon to produce an output proportional to the airspeed squared divided by two or $$\frac{V_p^2}{2}$$

This output is then operated upon to provide a voltage proportional to dynamic pressure, taking into account the effects of changes in the density of the surrounding air due to changes in altitude and air temperature as well as the effects attributable to airspeed.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

FIG. 1 is a schematic diagram of an exemplary embodiment of the instant invention, and FIG. 2 is a schematic diagram illustrating an altitude servo system which may be employed with FIG. 1.

Turning now to FIG. 1, terminals 2 and 4 have voltages impressed on them proportional to $V_p$ and $-V_p$ respectively. These voltages are computer voltages, representing airspeed, which are normally available in flight trainers, where they may have been derived in any of the conventional ways. The respective positive and negative voltages representative of airspeed are fed through summing resistors R-2 and R-4 to the input of an amplifier U-2 which has a resistor R-6 in its feedback circuit. The output of summing amplifier U-2 is applied to excite the winding of potentiometer R-8, the wiper arm of which is connected to be mechanically positioned by the simulator airspeed servo. The resistors R-2, R-4 and R-6 may be scaled in such a way that the output voltage on the arm of potentiometer R-8 is proportional to $$\frac{V_p^2}{2}$$

The analog squaring technique described in the preceding paragraph is more fully explained in U.S. Patent No. 2,904,253, granted September 15, 1959 to Edward G. Schwarm and Carrol L. Duren, which has been assigned to the same assignee as the present invention. In that disclosure the air speed servo was used to derive the $-V_p$ value as well as to position the potentiometer arm.

The exact manner in which the "airspeed squared" quantity is produced is not critical to this invention, and more conventional squaring apparatus using only the positive value of $V_p$ as an input to the amplifier U-2 with a position servo to position the wiper arm might be used to produce the square of $V_p$. The particular embodiment shown has been chosen because of the increased accuracy attainable in comparison with the prior art devices.

The output potential appearing on the wiper arm of a potentiometer R-8 is fed through a resistor R-10 to an amplifier U-10, which is provided with a feedback resistor R-12, and which reverses, the polarity of $$\frac{V_p^2}{2}$$

from positive to negative. The negative output of the amplifier U-10 is impressed across a padded potentiometer R-14. The potential on the wiper arm of the potentiometer R-14 obviously will be a function of both the position of the potentiometer wiper arm and the potential across potentiometer R-14. This relationship may be expressed in the form of a mathematical expression $$\frac{-V_p^2}{2}(h)$$

where $$\frac{-V_p^2}{2}$$

is the voltage applied across the potentiometer R-14 and $h$ represents the position of the wiper arm. $V_p$ represents airspeed and $h$ stands for pressure altitude.

One of the quantities which is used in the present invention for computing the dynamic pressure exerted on a simulated airplane is the temperature of the air surrounding the simulated airplane. This temperature may be determined by taking into account the sea level temperature, the temperature lapse rate, and the pressure altitude of the simulated airplane. The same computations may be utilized to determine the dynamic pressure on an actual airplane.

In the case of a simulator, as shown in FIG. 1, an arbitrarily selected sea level temperature may be chosen by an instructor who turns a knob 16 to position the wiper arm of a potentiometer R–16 to derive a voltage of suitable magnitude. The potentiometer R–16 has a suitable positive potential impressed on its input terminal 18 so that a voltage having a magnitude of reasonable proportions may be selected. The output potential appearing on the wiper arm of potentiometer R–16 is applied to ambient air temperature servo M–20 through resistor R–18. A potential proportional to the constant 273.18° C. is applied via resistor R–20, to ambient air temperature servo M–20 to supply a correction to make the output on the shaft of servo M–20 proportional to the absolute temperature in degrees Kelvin.

The potential supplied to the ambient air temperature servo M–20 through a resistor R–22 is proportional to the lapse rate ($a$) occurring in the atmosphere times the presure altitude ($h$). This potential is derived by providing a voltage proportional to the lapse rate from a potentiometer R–24, which has a negative potential applied at its terminal 24 and a positive potential applied at its terminal 26, with resistors R–26 and R–28 and a potentiometer R–24 connected in series between and with a grounded tap conected to R–24 at a point 30. The output voltage of the wiper arm of the potentiometer R–24 is determined by the voltage gradient across the resistor R–24 and the adjustment of knob 32 by the trainer instructor, and the voltage may be either positive or negative. The potential on the wiper arm of the potentiometer R–24 is applied to excite potentiometer R–32, which has jumpers connected across portions of its winding to provide a non-linearity simulating variations in lapse rate ($a$) with changes in pressure altitude which occur with changes in altitude. Pressure altitude servo M–34 is a conventional aircraft trainer servo having appropriate input quantities, not shown, which cause its shaft position to be determined in accordance with instantaneous simulated pressure altitude. Pressure altitude $h$ is otherwise designated as the ratio $P/P_{SL}$, the ratio between barometric pressure at altitude to barometric pressure at sea level. Servo M–34 may take the form shown in FIG. 2, for example.

The voltages appearing across the terminals of the resistors R–18, R–20, R–22 are applied to the input terminal of the ambient air temperature servo M–20. They are summed at that point with a position feedback voltage applied through a resistor R–40 to position the servo so that servo output position is proportional to ambient air temperature. The operation of this apparatus may be clearer if one considers the following equation:

$$T_o + 273.18 + ah = T_a \qquad (1)$$

where $T_o$ is the sea level temperature in degrees centigrade,
273.18 is the correction necessary to change from centigrade to absolute degrees Kelvin,
$a$ represents the temperature lapse rate,
$h$ the pressure altitude,
$T_a$ is the ambient or outside air temperature, and the scaling resistors of the apparatus used to represent this equation are equal to each other.

Equation 1 illustrates that the sum of the voltages applied to the input terminal of the ambient air temperature servo M–20 is zero and consequently that the shaft of the servo will be positioned in accordance with the ambient air temperature. In this way, a shaft position proportional to ambient air temperature is provided to actuate any desired computer apparatus. It is apparent that Equation 1 is based on a construction in which the scaling resistors R–18, R–20, R–22 and R–40 are of equal magnitude and thus that the factors of the equation need not be shown to be divided individually by their respective resistors, as would otherwise be the case.

Ambient air temperature servo M–20 positions the wiper arm of a potentiometer R–42 so that the output of a dynamic pressure amplifier U–42 is multiplied by the ambient air temperature, and the voltage appearing on the wiper arm of the potentiometer R–42 is fed back through a resistor R–44 to the input terminal 46 of the dynamic pressure amplifier U–42. The altitude servo M–34 positions the wiper arm of the potentiometer R–14 through its shaft in a manner such that the voltage impressed on the terminal 46 through a resistor R–48 is proportional to $$\frac{V_p^2}{2}$$

times the pressure altitude $h$. A resistor R–50 serves as a stabilizing feedback resistor for the amplifier U–42.

In order to make the operation of the dynamic pressure amplifier U–42 and its associated circuits clearer, the reader's attention is invited to the following considerations:

According to the ideal gas law:

$$\rho = \frac{P}{RT} \qquad (2)$$

where $\rho$ is density,
P is pressure,
T is the absolute temperature, and
R is a constant.

In order to obtain density in slugs per cubic foot, where pressure is expressed in pounds per square foot and temperature in degrees Kelvin, R must be equal to $$3.08965 \times 10^3$$

Combining Equations 1 and 2 above, the following equation may be derived:

$$\rho = \frac{P}{R(T_o + 273.18 + ah)} \qquad (3)$$

Using the relation for dynamic pressure:

$$q = \tfrac{1}{2} V_p^2 \qquad (4)$$

where $V_p$ is airspeed and combining Equations 3 and 4, the following equation is derived:

$$q = \frac{PV_p^2}{2R(T_o + 273.18 + ah)} \qquad (5)$$

This equation shows the interrelationship of some of the factors considered in connection with this invention. The pressure (P) has not been shown as directly involved in the circuitry, but this is accounted for when we recall that pressure P is a function of pressure altitude $h$, as represented by the position of the shaft of the pressure altitude servo M–34. This being so, Equation 5 may be rewritten with $f_1(h)$ substituted for (P) as follows:

$$q = \frac{f_1(h) V_p^2}{2R(T_o + 273.18 + ah)} \qquad (6)$$

Further analysis of the illustrated embodiment of this invention indicates that the sum of the currents applied at the input terminal of the dynamic pressure servo amplifier U–42, is as follows:

$$\frac{-V_p^2 f_1(h)}{2R_{48}} + \frac{qT_a}{R_{44}} + \frac{q}{R_{50}} = 0 \quad (7)$$

where $R_{48}$, $R_{44}$ and $R_{50}$ represent the resistances of resistors R–48, R–44 and R–50 respectively.

Equation 7 can easily be reduced to the following form:

$$q = \frac{V_p^2 f_1(h)}{2R_{48}} \cdot \frac{1}{\frac{T_a}{R_{44}} + \frac{1}{R_{50}}} \quad (8)$$

the quantity $$\frac{1}{R_{50}}$$

generally is small enough to be neglected when compared with $$\frac{T_a}{R_{44}}$$

so that Equation 8 can be rewritten as follows:

$$q = \frac{f_1(h) V_p^2 R_{44}}{2R_{48} T_a} \quad (9)$$

Equation 9 can be reduced to the form of Equation 6 by substituting a constant $$\frac{1}{R} \quad \text{for} \quad \frac{R_{44}}{R_{48}}$$

and the equality in Equation 1 for $T_a$. The scaling resistors R–44, R–48 and R–50 in a preferred embodiment were of unequal magnitude, so this detailed treatment has been made. In case the scaling resistors are of equal magnitude, as was the case with the circuit associated with Equation 1, they may be dropped out, as by clearing fractions in Equation 7.

A servo M–54 may be operated from the output voltage of the dynamic pressure amplifier U–42 through a resistor R–52. Feedback or follow-up potential for the servo may be provided by a voltage from the wiper arm of a potentiometer R–56, which is suitably energized at its terminal 56, through a resistor R–58. The shaft position provided by the servo M–54 may be linked with a suitable meter (not illustrated) to show dynamic pressure and may be connected wherever a shaft position proportional to dynamic pressure is needed, as in the generation of force.

The derivation of a shaft position proportional to $$\frac{P}{P_{SL}}$$

herein referred to as pressure altitude ($h$), may be accomplished by the apparatus of FIG. 2.

A negative D.C. voltage is applied at a terminal 200 through a resistor R–202 and across a padded potentiometer R–204. The values of the potentiometer R–204 are chosen such that the wiper arm moving in response to variations in altitude ($h$), according to the shaft position 206, produces an output voltage which is proportional to $$\frac{-P}{P_{SL}}$$

The value ($h$) may be provided as a shaft position at 206 either by hand operation or as an output derived from a simulator.

The voltage from the wiper arm of potentiometer R–204 is applied to the input terminal 210 of a $$\frac{P}{P_{SL}}$$

servo M–212, which in turn positions the wiper arm of a potentiometer R–216. Since the voltage applied to the input terminal 214 of potentiometer R–216 is positive, a positive voltage which is a function of $$\frac{P}{P_{SL}}$$

will be fed through a resistor R–218 to the input terminal 210 of servo M–212 to stabilize it and assure that the shaft of the servo M–212 maintains a position proportional to $$\frac{P}{P_{SL}}$$

It is evident that the output voltages of the amplifiers illustrated in connection with this invention may be used elsewhere as sources for voltages proportional to the functions generated. All that is necessary is a connection in each instance to suitable isolating means and no attempt has been made herein to illustrate all the possibilities. Further illustrations of certain aspects of this invention are set forth in a copending application of Edward G. Schwarm entitled "Computation of Mach Number for a Flight Simulator Operating in a Non-Standard Atmosphere," Serial Number 743,164, filed on June 19, 1958, and assigned to the same assignee as the instant invention.

The shaft positions generated by the servo systems illustrated in connection with this invention may be used to position the indicators on meters, the wiper arms of potentiometers, or any other apparatus in which the function represented is useful as a shaft position. A particularly usual application of a shaft position proportional to dynamic pressure is as a multiplier to multiply the pressure by a simulated effective area to derive a simulated moment or simulated force.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. Grounded aircraft trainer computer apparatus for providing an output potential commensurate with the instantaneous dynamic pressure acting on a simulated aircraft, said apparatus being operable over a range of variable simulated atmospheric conditions and comprising, in combination: first computer means including means for deriving a first voltage commensurate with the square of airspeed of said simulated aircraft and first potentiometer means connected to be excited in accordance with said first voltage and positioned by a pressure altitude servomechanism for modifying said first voltage in accordance with a pressure function of simulated altitude to provide a second voltage; second potentiometer means adjustable by an instructor in accordance with a desired simulated temperature at a reference altitude for providing a third voltage; second computer means including cascaded third potentiometer means adjustable by an instructor in accordance with a desired simulated temperature lapse rate and fourth potentiometer means positioned by said pressure altitude servomechanism for providing a fourth voltage commensurate with the product of altitude and lapse rate; a position servomechanism responsive to said third and fourth voltages providing a shaft position quantity commensurate with simulated ambient air temperature; a feedback amplifier responsive to said second voltage and a feedback voltage for providing said dynamic pressure output potential; and a further potentiometer connected to be excited by said output potential and connected to be positioned by said simulated ambient air temperature shaft position quantity for providing said feedback voltage.

2. Apparatus according to claim 1 having further means for deriving a constant potential commensurate with a temperature scale conversion factor, said position servomechanism being responsive to said third and fourth voltages and said constant potential and operative to provide a shaft position quantity commensurate with simulated absolute ambient air temperature.

References Cited in the file of this patent

UNITED STATES PATENTS

| | | |
|---|---|---|
| 2,658,673 | Darlington | Nov. 10, 1953 |
| 2,784,501 | Stern et al. | Mar. 12, 1957 |
| 2,798,308 | Stern et al. | July 9, 1957 |
| 2,858,623 | Stern et al. | Nov. 4, 1958 |